United States Patent
Handa (10) Patent No.: US 10,844,896 B2
(45) Date of Patent: *Nov. 24, 2020

(54) TORQUE-INDICATION CRUSH WASHER

(71) Applicant: Manoj Handa, Garland, TX (US)

(72) Inventor: Manoj Handa, Garland, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/944,576

(22) Filed: Apr. 3, 2018

(65) Prior Publication Data

US 2018/0223892 A1  Aug. 9, 2018

Related U.S. Application Data (63) Continuation of application No. 15/386,305, filed on Dec. 21, 2016, now Pat. No. 9,970,472, which is a continuation of application No. 13/487,810, filed on Jun. 4, 2012, now Pat. No. 9,541,117.

(51) Int. Cl.
*F16B 31/02* (2006.01)
*F16B 43/00* (2006.01)

(52) U.S. Cl.
CPC ............ *F16B 31/028* (2013.01); *F16B 43/00* (2013.01)

(58) Field of Classification Search
CPC .............................. F16B 31/028; F16B 43/00
USPC .................... 411/3, 9, 10, 82, 531, 542, 544
See application file for complete search history.

(56) References Cited

U.S. PATENT DOCUMENTS

| | | | |
|---|---|---|---|
| 2,339,549 A | 1/1944 | Kubaugh | |
| 2,666,354 A * | 1/1954 | Dim | ...................... F16B 43/001 411/371.1 |
| 3,137,268 A | 6/1964 | Hornwood | |
| 3,519,279 A | 7/1970 | Wagner | |
| 3,588,133 A | 6/1971 | Caserta | |
| 3,670,618 A | 6/1972 | Jellison | |
| 3,696,412 A | 10/1972 | Swanson | |
| 3,761,867 A | 9/1973 | Churla | |
| 3,948,141 A | 4/1976 | Shinjo | |
| 4,037,516 A | 7/1977 | Hart | |
| 4,205,572 A | 6/1980 | Weiner | |
| 4,520,606 A | 6/1985 | Francovitch | |
| 4,555,206 A * | 11/1985 | Sweeney | ................. F16B 19/00 405/259.6 |
| 5,281,065 A | 1/1994 | Wu | |
| 6,135,687 A | 10/2000 | Leek | |
| 7,021,153 B2 | 4/2006 | Almonstoetter | |
| 8,002,641 B2 | 8/2011 | Wallace | |
| 8,382,409 B2 | 2/2013 | Wallace | |
| 8,920,088 B1 * | 12/2014 | Garvin | ................ F16B 15/0092 411/442 |

OTHER PUBLICATIONS

"How silicone lubricants work," http://www.dowcorning.com/content/discover/discoverchem/si-lubricants.aspx, pp. 1-2.

* cited by examiner

*Primary Examiner* — Gary W Estremsky (74) *Attorney, Agent, or Firm* — Trop, Pruner & Hu, P.C.

(57) ABSTRACT

An apparatus comprises a metal washer having an outer circumference, a plurality of cavities formed within the washer, wherein each cavity has an opening that is flush with the outer circumference, an indicator material comprising an inspection lacquer within at least one of the cavities, and a membrane along the outer circumference sealing the inspection lacquer within the cavity.

20 Claims, 7 Drawing Sheets

TORQUE-INDICATION CRUSH WASHER

This application is a continuation of U.S. patent application Ser. No. 15/386,305, filed Dec. 21, 2016 and entitled "Torque-Indication Crush Washer", which is a continuation of U.S. patent application Ser. No. 13/487,810, filed Jun. 4, 2012 and entitled "Torque-Indication Crush Washer", which issued on Jan. 10, 2017, as U.S. Pat. No. 9,541,117. The content of each of the above applications is hereby incorporated by reference.

BACKGROUND

Crush washers are used to seal fluid or gas connections such as those found in an internal combustion engine. For instance, crush washers are used to provide a seal between an oil pan and a drain bolt to prevent engine oil from leaking. Similarly, crush washers are used to seal the connection between a transfer case pan and a drain bolt to prevent gear oil from leaking and between a transmission pan and a drain bolt to prevent transmission fluid from leaking. There are many other applications within an internal combustion engine where a crush washer may be utilized.

When the drain bolt is tightened onto the pan, care must be taken to avoid over-torqueing of the bolt as this may cause the pan to become cracked. The crush washer provides a margin of safety in that the crush washer is designed to deform when a torque sufficient to prevent leaking has been applied to the bolt. The deforming of the crush washer allows the bolt to be over-torqued a slight amount before damage to the pan occurs. There are instances, however, when the deformation of the crush washer may go unnoticed. In such instances, if torque continues to be applied to the bolt, then this margin of safety is overcome and the pan may become damaged and/or leak.

DETAILED DESCRIPTION

Described herein is a crush washer that provides a visual indication of when a sufficient amount of torque has been applied to a bolt. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations.

Figure 1:
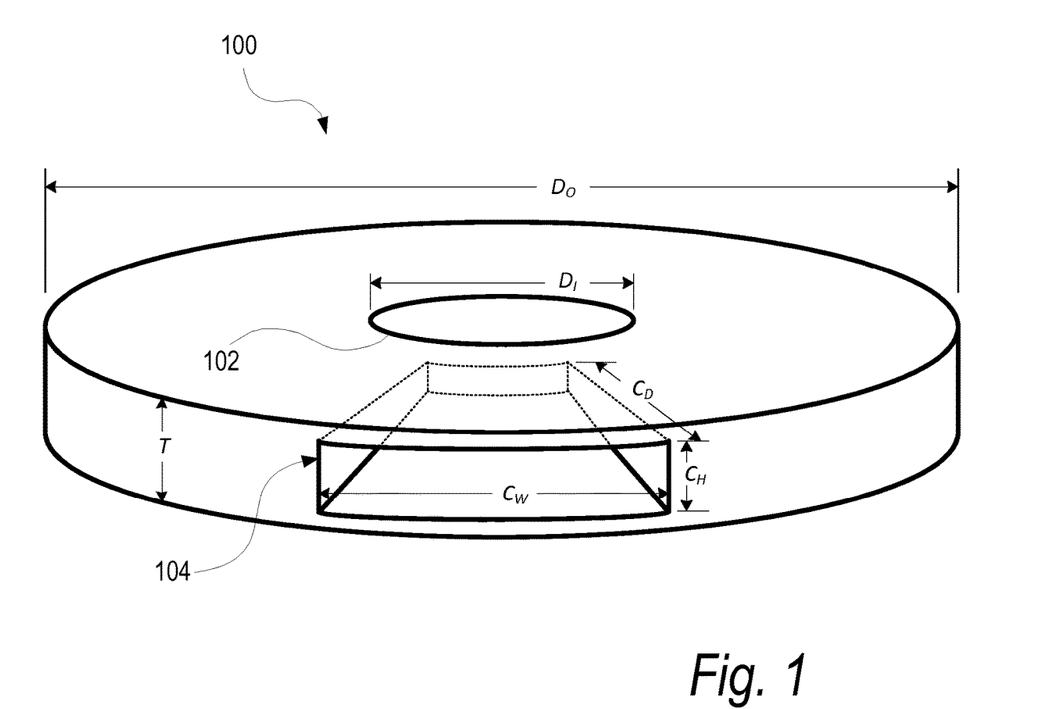
FIG. 1 is a perspective view of a torque-indicating crush washer formed in accordance with an implementation of the invention showing one cavity.

FIG. 1 is a perspective view of a torque-indicating crush washer 100 constructed in accordance with a first implementation of the invention. Similar to a conventional washer, the torque-indicating crush washer 100 consists of an annulus having an inner diameter $D_I$ and an outer diameter $D_O$. The torque-indicating crush washer 100 includes a center hole 102 through which a bolt, a screw, or another similar item may be inserted or threaded.

The range of lengths for inner diameter $D_I$ and an outer diameter $D_O$ can cover over any conceivable lengths imaginable for a washer. For example, in some implementations of the invention, the inner diameter $D_I$ can range from one millimeter (1 mm) to 200 mm and the outer diameter $D_O$ can range from just over 1 mm to over 200 mm. Nanotechnology applications for the torque-indicating crush washer 100 of the invention may use lengths of less than 1 mm for both the inner diameter $D_I$ and an outer diameter $D_O$. Similarly, large-scale applications for the torque-indicating crush washer 100 may use lengths greater than 200 mm for the inner diameter $D_I$ and an outer diameter $D_O$.

The torque-indicating crush washer 100 also has a thickness T. In some implementations of the invention, the thickness T of the torque-indicating crush washer 100 can range from less than 1 mm to around 50 mm. Nanotechnology applications for the torque-indicating crush washer 100 of the invention may use a thickness T that is less than 1 mm.

Similarly, large-scale applications for the torque-indicating crush washer 100 may use a thickness T that is greater than 200 mm.

It should be noted that the dimensions of the torque-indicating crush washer 100 will vary based upon its intended application. For instance, the dimensions of a torque-indicating crush washer 100 that is used for an automotive application may differ from the dimensions of a torque-indicating crush washer 100 that is used for a motorcycle application or a boat application. The specific dimensions provided herein are not intended to restrict or otherwise limit the scope and spirit of the invention.

Figure 6:
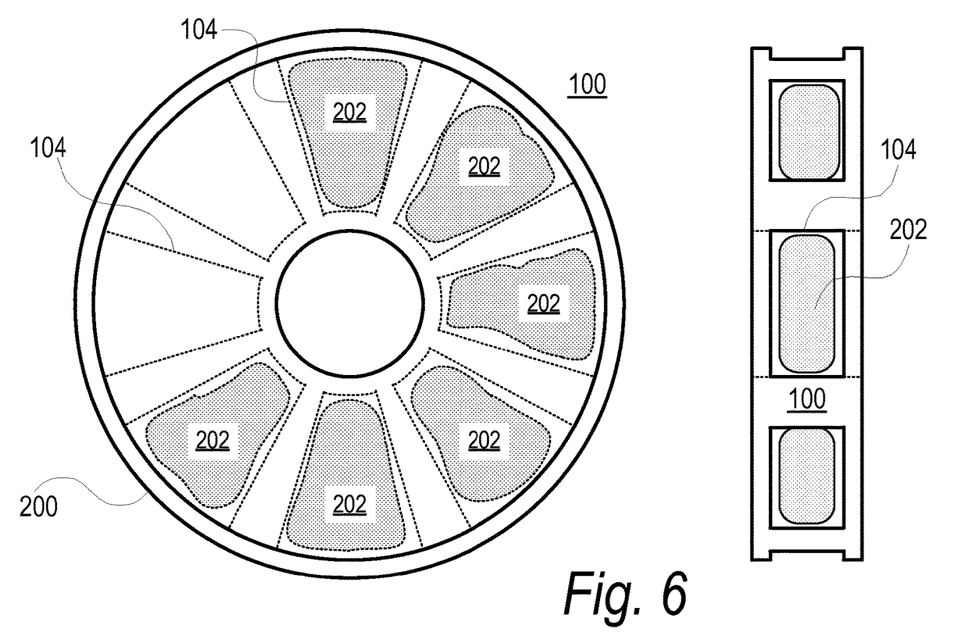
FIG. 6 is a top view and a side view of a torque-indicating crush washer formed in accordance with an implementation of the invention showing eight relatively narrow and deep cavities.
Figure 7:
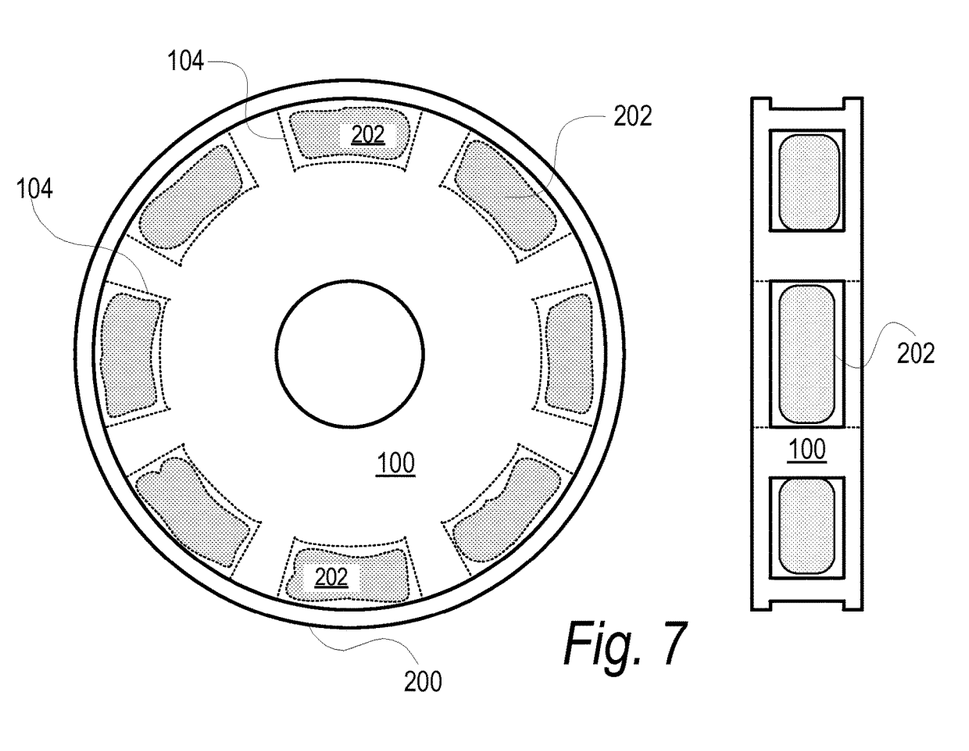
FIG. 7 is a top view and a side view of a torque-indicating crush washer formed in accordance with an implementation of the invention showing eight relatively narrow and shallow cavities.

In accordance with implementations of the invention, the torque-indicating crush washer 100 includes one or more cavities 104 formed along its perimeter. Each cavity 104 consists of an open hollow or void with an opening that is flush with an outer perimeter or circumference of the torque-indicating crush washer 100. The number of cavities 104 will vary in different implementations of the invention. For instance, in the implementation shown in FIG. 1, the torque-indicating crush washer 100 includes a single cavity 104. In the implementations shown in FIGS. 2 and 3, the torque-indicating crush washer 100 includes four cavities 104. And the implementations shown in FIGS. 6 and 7 illustrate a torque-indicating crush washer 100 having eight cavities 104. There is no limit to the number of cavities 104 that may be formed in the torque-indicating crush washer 100. In accordance with the various implementations of the invention, the number of cavities 104 formed is based on factors such as the intended use of the torque-indicating crush washer 100, the amount of torque or force that the torque-indicating crush washer 100 is designed to withstand, the technology and materials used to build the torque-indicating crush washer 100, as well as the specific dimensions of the torque-indicating crush washer 100 itself. For example, the use of nanotechnology processes and materials may enable the formation of millions of cavities 104 in the torque-indicating crush washer 100. And as another example, a torque-indicating crush washer 100 that is designed to tolerate a relatively high degree of force or torque may include fewer cavities 104 to improve its mechanical integrity.

Each cavity 104 has a cavity width $C_W$, which is measured across the opening of the cavity 104 and along the perimeter of the torque-indicating crush washer 100. Each cavity 104 also has a cavity height $C_H$ measured across the opening of the cavity 104 but along the thickness of the torque-indicating crush washer 100. Finally, each cavity 104 has a cavity depth $C_D$ that provides a distance from the opening of the cavity 104 to the bottom of the cavity 104. The bottom of the cavity 104 may be located proximate to the center hole 102 of the torque-indicating crush washer 100 in some implementations.

In implementations of the invention, the depth $C_D$ of the cavity 104 will be a value that is less than one-half the difference between the outer diameter $D_O$ and the inner diameter $D_I$. In other words:

$$C_D < (D_O - D_I)/2$$

In an alternate implementation described below in FIG. 8, the cavity depth $C_D$ may be equal to one-half the difference between the outer diameter $D_O$ and the inner diameter $D_I$. In other words:

$$C_D = (D_O - D_I)/2$$

Figure 4:
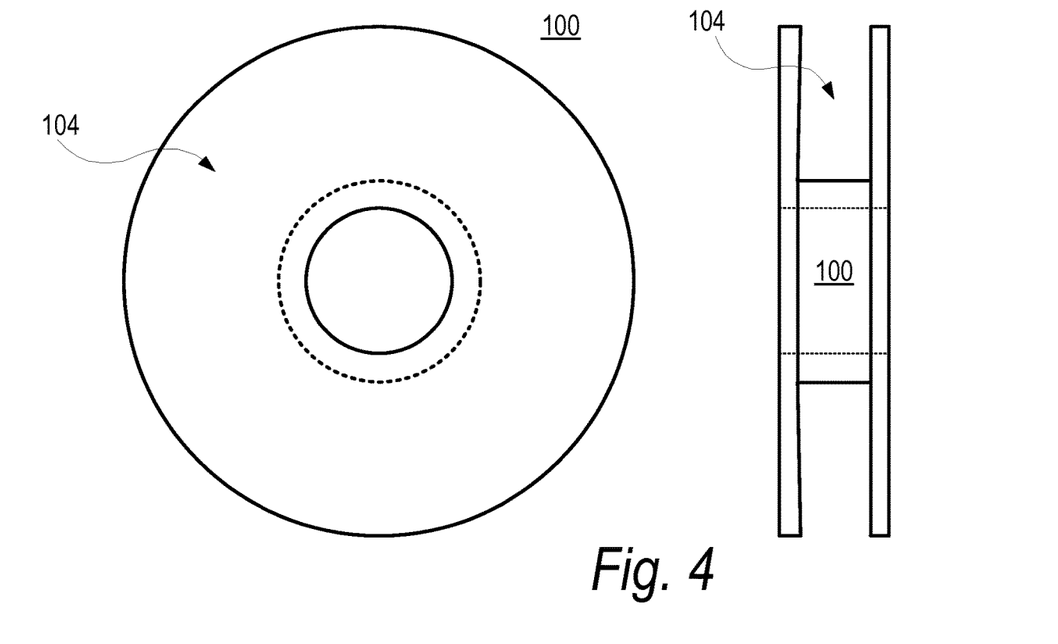
FIG. 4 is a top view and a side view of a torque-indicating crush washer formed in accordance with an implementation of the invention showing one cavity that extends around the entire circumference of the crush washer.
Figure 5:
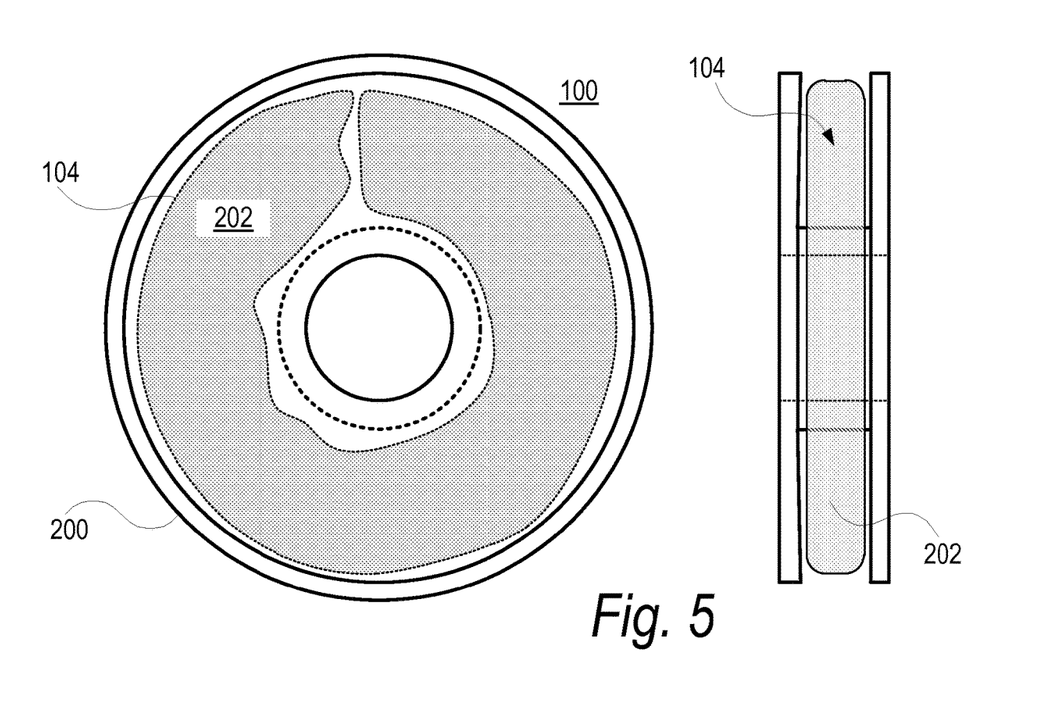
FIG. 5 is a top view and a side view of the torque-indicating crush washer of FIG. 4, but filled with an indicator material that is sealed within the crush washer by an outer membrane.

In one implementation of the invention, shown in FIGS. 4 and 5, the cavity width $C_W$ is equal to the circumference of the torque-indicating crush washer 100. In this implementation there are no individual cavities 104, instead, the entire interior of the torque-indicating crush washer 100 is hollow.

Figure 2:
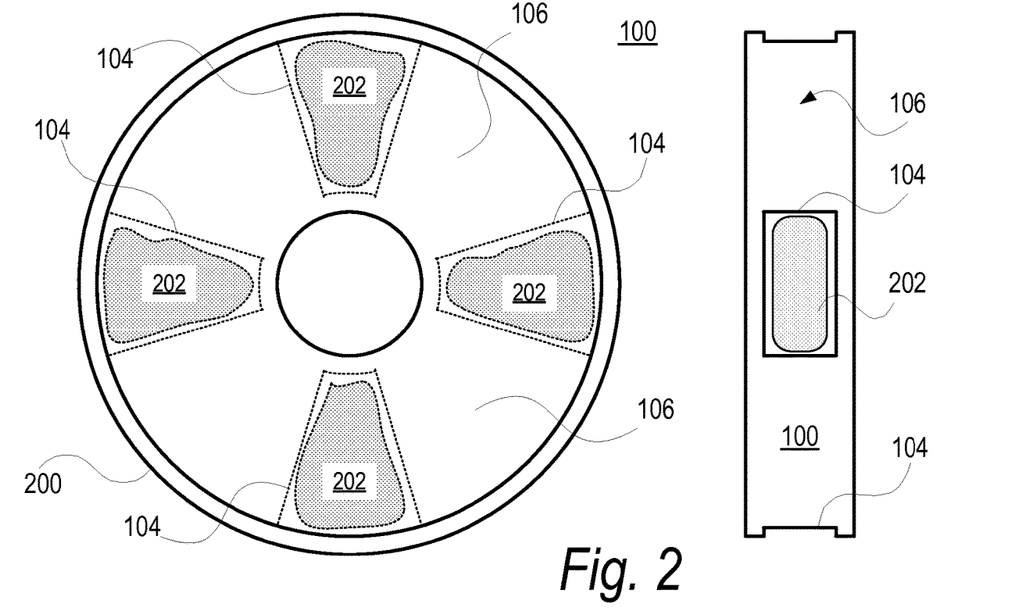
FIG. 2 is a top view and a side view of a torque-indicating crush washer formed in accordance with an implementation of the invention showing four relatively narrow cavities.
Figure 3:
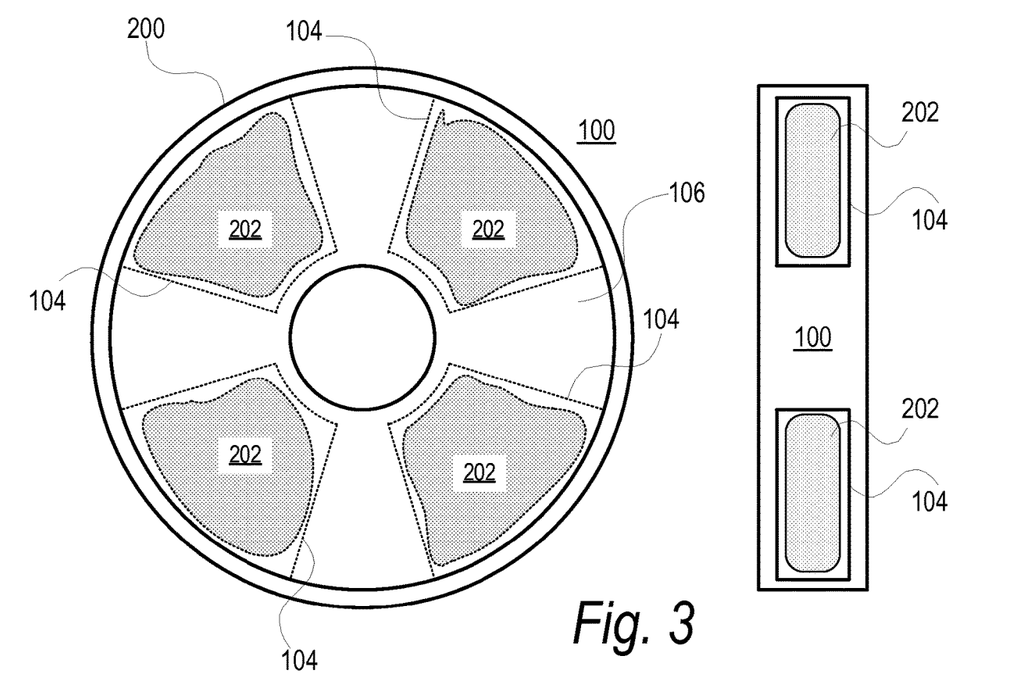
FIG. 3 is a top view and a side view of a torque-indicating crush washer formed in accordance with an implementation of the invention showing four relatively wide cavities.
Figure 10:
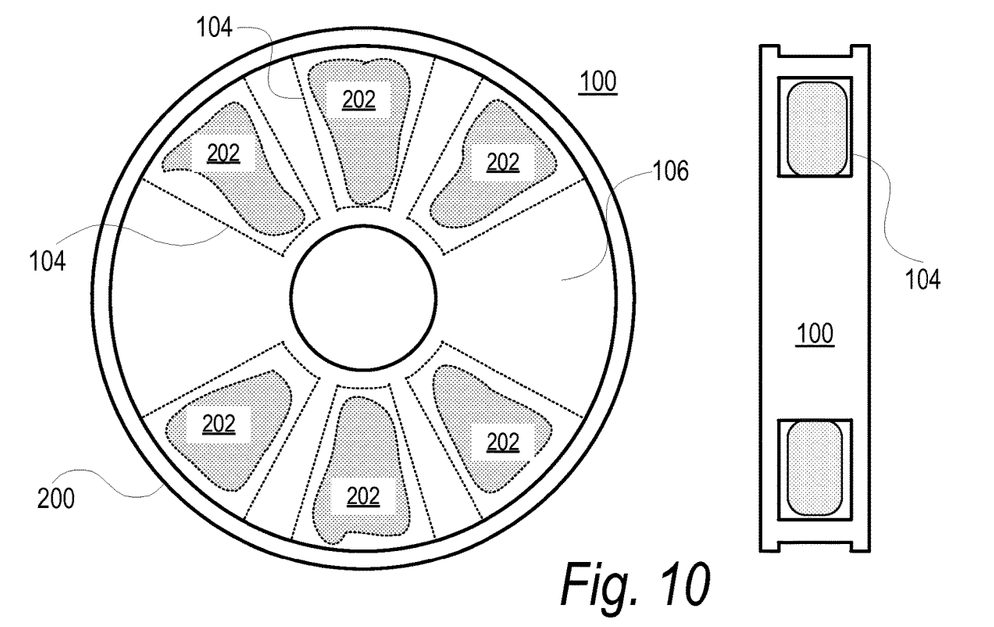
FIG. 10 is a top view and a side view of a torque-indicating crush washer formed in accordance with an implementation of the invention showing six relatively narrow and unevenly distributed cavities.

The cavities 104 may be regularly or irregularly spaced around the circumference of the torque-indicating crush washer 100. In one specific implementation, the torque-indicating crush washer 100 may include four evenly spaced cavities 104, as shown in FIGS. 2 and 3. In another specific implementation, the torque-indicating crush washer 100 may include eight evenly spaced cavities 104, as shown in FIGS. 6 and 7. And as shown in FIG. 10, the cavities 104 may be distributed around the torque-indicating crush washer 100 in an irregular pattern. FIG. 10 illustrates six cavities 104 arranged in an irregular pattern, but in further implementations, more or less than six cavities 104 may be arranged in an irregular pattern.

The torque-indicating crush washer 100 may be formed using a malleable metal or any other material suitable for use in a conventional crush washer. In some implementations of the invention, the torque-indicating crush washer 100 may be formed from metals that include, but are not limited to, copper, copper alloy, aluminum, aluminum alloy, silver, silver alloy, tin, tin alloy, nickel, nickel alloy, as well as alloys of these or other metals used in similar applications. In further implementations, one or more of the following metals may be used to form the torque-indicating crush washer 100: zinc, molybdenum, carbon, manganese, cadmium, titanium, chromium, iron, cobalt, zirconium, niobium, technetium, ruthenium, rhodium, palladium, hafnium, tantalum, tungsten, rhenium, osmium, iridium, platinum, gold, mercury, rutherfordium, dubnium, seaborgium, bohrium, hassium, copernicium, gallium, indium, thallium, lead, vanadium, and bismuth.

In alternate implementations of the invention, a polymer or plastic based material may be used to form the torque-indicating crush washer 100. It should be noted that the material used to form the torque-indicating crush washer 100 is not limited to a metal, a polymer, or a plastic. Furthermore, the force-tolerance and torque-tolerance of the torque-indicating crush washer 100 may be configured for a wide variety of applications by varying the type of material used and/or by varying the density of the material used. If metal is used, then varying the type of metal or metal-alloy used may also configure the force-tolerance and torque-tolerance of the torque-indicating crush washer 100.

FIGS. 2 and 3 illustrate top and side views of torque-indicating crush washers 100 formed in accordance with further implementations of the invention. Both implementations shown have four regularly spaced cavities 104 formed in the torque-indicating crush washer 100. FIG. 2 illustrates cavities 104 that are narrower than the implementation shown in FIG. 3.

Separating walls 106 isolate the cavities 104 of the torque-indicating crush washer 100 from one another. The separating walls 106 also provide resistance to the force or torque that is applied when the torque-indicating crush washer 100 is in use. Therefore, another means by which the force-tolerance and torque-tolerance of the torque-indicating crush washer 100 may be configured is by adjusting the width or thickness of the separating walls 106.

For example, for high-torque applications where the torque-indicating crush washer 100 is configured to become deformed at a relatively high degree of force and torque, the separating walls 106 may be relatively wide. The relatively wide separating walls 106 provide greater metal volume within the torque-indicating crush washer 100 and thereby provide greater resistance to the applied force or torque. As shown in FIG. 2, the cavities 104 may be relatively narrow and the separating walls 106 are correspondingly wide. As such, the torque-indicating crush washer 100 of FIG. 2 may be used in a relatively high-torque application.

For low-torque applications where the torque-indicating crush washer 100 is configured to become deformed at a relatively low degree of force and torque, the separating walls 106 may be relatively narrow. The relatively narrow separating walls 106 provide less metal volume within the torque-indicating crush washer 100 and thereby provide less resistance to the applied force or torque. As shown in FIG. 3, the cavities 104 may be relatively wide and the separating walls 106 are correspondingly narrow. The torque-indicating crush washer 100 of FIG. 3 may therefore be used in a relatively low-torque application.

As shown in FIGS. 2 and 3, at least one of the cavities 104 contains an indicator material 202. In accordance with implementations of the invention, the torque-indicating crush washer 100 is designed such that when a predetermined amount of force or torque is applied, the torque-indicating crush washer 100 deforms and the indicator material 202 discharges from the cavity 104. The discharge of the indicator material 202 from the cavity 104 provides a visual indication that the predetermined amount of force or torque has been applied to the torque-indicating crush washer 100.

In some implementations of the invention, when the indicator material 202 is discharged from the cavity 104, it will generally adhere to surfaces proximate to the torque-indicating crush washer 100. For instance, if the torque-indicating crush washer 100 is being used in an oil-changing automotive application to seal a connection between a drain bolt and an oil pan, the indicator material 202 may discharge onto the surface of the oil pan, onto the exterior surfaces of the torque-indicating crush washer 100, and/or onto the drain bolt itself. In other applications, the indicator material 202 will similarly adhere to surfaces proximate to the torque-indicating crush washer 100, including but not limited to the hand of a user or the tool being used to apply the torque.

In accordance with one implementation of the invention, the indicator material 202 may be a color such as red, blue, green, yellow, pink, or any other color that enables a user to easily see when the indicator material 202 has been discharged. In accordance with further implementations of the invention, the indicator material 202 may be chosen from a group of materials that includes, but is not limited to, a grease, an oil, an ink, an epoxy, a sealant, a liquid rubber, a glue, a caulking material, a latex, an acrylic, a silicone, a gel, or an inspection lacquer such as Torque-Seal® by Organic Products Co. of Dallas, Tex. In implementations of the invention, the indicator material 202 may be a material that is resistant to removal from any surfaces it has adhered to upon discharging from the torque-indicating crush washer 100. In further implementations, the indicator material 202 may consist of a material that is heat-resistant or can tolerate a high heat. In yet further implementation of the invention, the indicator material 202 may consist of a material that changes composition or physical properties when exposed to air upon discharge, such as a material that hardens or cures when exposed to air.

In some implementations of the invention, the indicator material 202 may consist of a material that has the ability to remain on surfaces proximate to the torque-indicating crush washer 100 for long periods of time. This provides a long-lasting, visual indication that the appropriate amount of torque had been applied. Thus, in situations where some time has passed and a question arises concerning whether an appropriate amount of torque had been applied, the presence of the indicator material 202 can confirm that indeed it had.

The top view of FIGS. 2 and 3 further illustrate a membrane 200 that is formed along the outer perimeter of the torque-indicating crush washer 100. The membrane 200 seals the cavities 104 to hold the indicator material 202 within the cavity 104 until the indicator material 202 is discharged through the application of a sufficient force and/or torque on the torque-indicating crush washer 100. The membrane 200 also prevents the indicator material from drying out or curing. In implementations of the invention, the membrane 200 may be formed of materials that include, but are not limited to, rubber, plastic, polymer, or metal. In some implementations, the membrane 200 may be formed using the same material that is used to form the torque-indicating crush washer 100. The force-tolerance and torque-tolerance of the torque-indicating crush washer 100 may be configured for a wide variety of applications by varying the type of material used to form the membrane 200, by varying the density of the material used to form the membrane 200, and/or by varying the thickness of the membrane 200. It should be noted that to expose the cavities 104, the side view of the torque-indicating crush washer 100 shown in FIGS. 2 and 3 does not include the membrane 200.

FIGS. 4 and 5 illustrate an implementation of the invention wherein the cavity 104 extends the entire circumference of the torque-indicating crush washer 100. FIG. 4 illustrates the torque-indicating crush washer 100 with no membrane 200 and no indicator material 202. As shown in the side view of FIG. 4, the torque-indicating crush washer 100 consists of a center annulus portion with top and bottom sides that extend out from the center portion, similar to a spool. In FIG. 5, the top view shows the indicator material 202 filling the cavity 104 and a membrane 200 that encircles the torque-indicating crush washer 100 and seals the indicator material 202 within the washer 100. The side view of FIG. 5 does not illustrate the membrane 200 in order to expose the indicator material 202.

FIGS. 6 and 7 illustrate top and side views of another implementation of a torque-indicating crush washer 100 that includes eight cavities 104. FIG. 6 illustrates one implementation where the cavities 104 are relatively deep and extend almost to the center portion of the torque-indicating crush washer 100. Only a subset of the cavities 104 of the torque-indicating crush washer 100 of FIG. 6 are filled with indicator material 202. As mentioned above, not all of the cavities 104 are required to be filled with indicator material 202. In some implementations, empty cavities 104 may be included simply to help configure the force/torque resistance of the torque-indicating crush washer 100.

FIG. 7 illustrates another implementation where the cavities 104 are relatively shallow and only extend about a quarter of the way to the center portion of the torque-indicating crush washer 100. Here, all of the cavities 104 are filled with indicator material 202. In both top views of FIGS. 6 and 7, a membrane 200 is shown that seals the cavities 104. The membrane 200 is not shown in the side views of FIGS. 6 and 7 in order to expose the cavities 104.

It should be noted that the use of shallow cavities 104 in the implementation of FIG. 7 results in more metal being included in the interior region of the torque-indicating crush washer 100 relative to the implementation of FIG. 6. This causes the implementation shown in FIG. 7 to have increased resistance to any force and/or torque that is applied. Thus, the force-tolerance and torque-tolerance of the torque-indicating crush washer 100 may also be configured for a wide variety of applications by varying the depth of the cavities 104.

Figure 8:
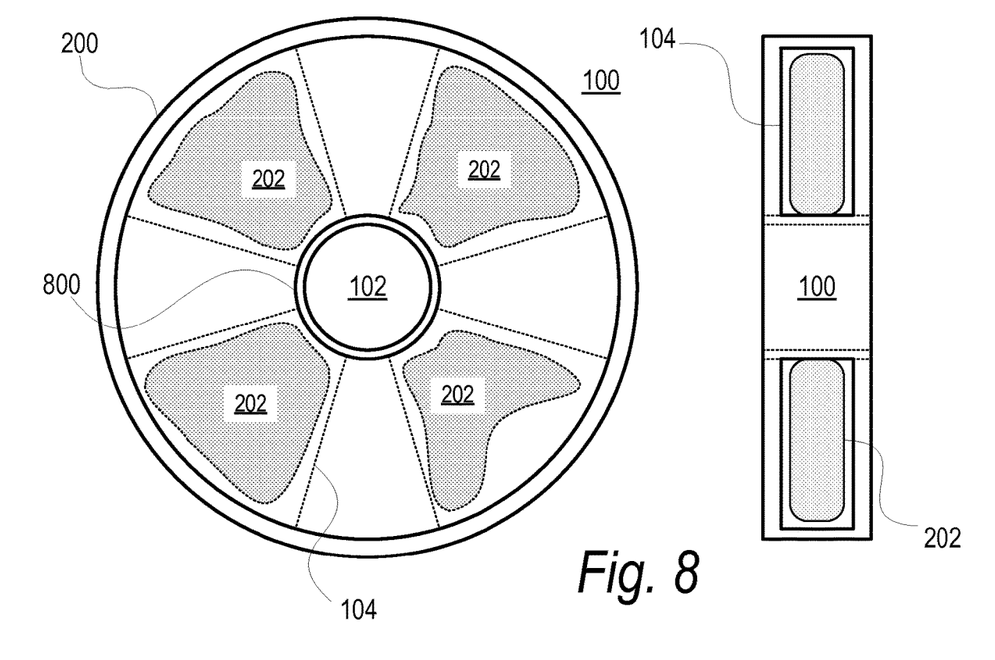
FIG. 8 is a top view and a side view of a torque-indicating crush washer formed in accordance with an implementation of the invention showing four relatively wide cavities that extend through the center of the crush washer.

FIG. 8 illustrates a top view and a side view of a torque-indicating crush washer 100 wherein the cavities 104 extend from the outer perimeter all the way through the center hole 102. In this implementation two membranes, membrane 200 as well as a second membrane 800 used within the center hole 102, are used to seal the cavities 104. In the side view of FIG. 8, the membrane 200 is not shown to expose the cavities 104.

Figure 9:
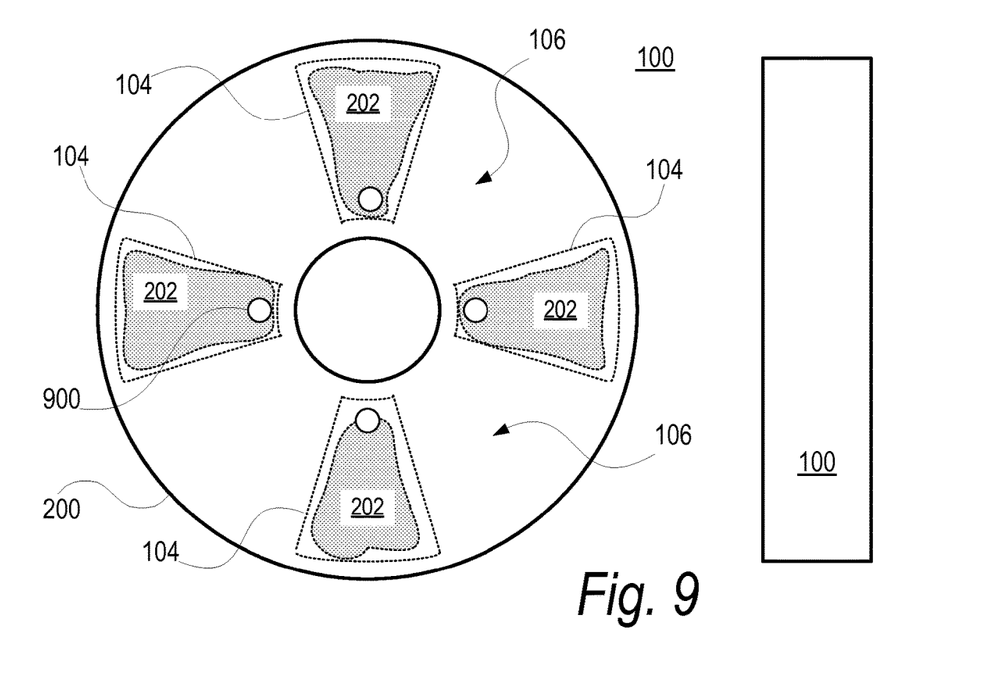
FIG. 9 is a top view and a side view of a torque-indicating crush washer formed in accordance with an implementation of the invention showing four relatively narrow cavities that are formed directly within the crush washer without the use of an outer membrane.

FIG. 9 illustrates a top view and a side view of a torque-indicating crush washer 100 wherein the cavities 104 are simply hollows that are fully encapsulated within the body of the crush washer 100 and the membrane 200 is therefore not needed. Since the cavities 104 do not extend to the outer perimeter of the torque-indicating crush washer, this implementation includes ports 900 that are connected to each cavity 104 and may be used to inject the indicator material 202 into each cavity 104. The ports 900 may then be sealed using a metal or another material to complete formation of the torque-indicating crush washer 100. The side view of FIG. 9 does not illustrate the cavities 104.

FIG. 10 illustrates a torque-indicating crush washer 100 wherein the cavities 104 are irregularly spaced. As shown, three cavities 104 are formed towards one side of the torque-indicating crush washer 100 and three more cavities 104 are formed on the opposite side. Large separating walls 106 are formed between the two sets of cavities 104. The membrane 200 is not shown in the side view of FIG. 10 in order to expose the cavities 104.

Figure 11:
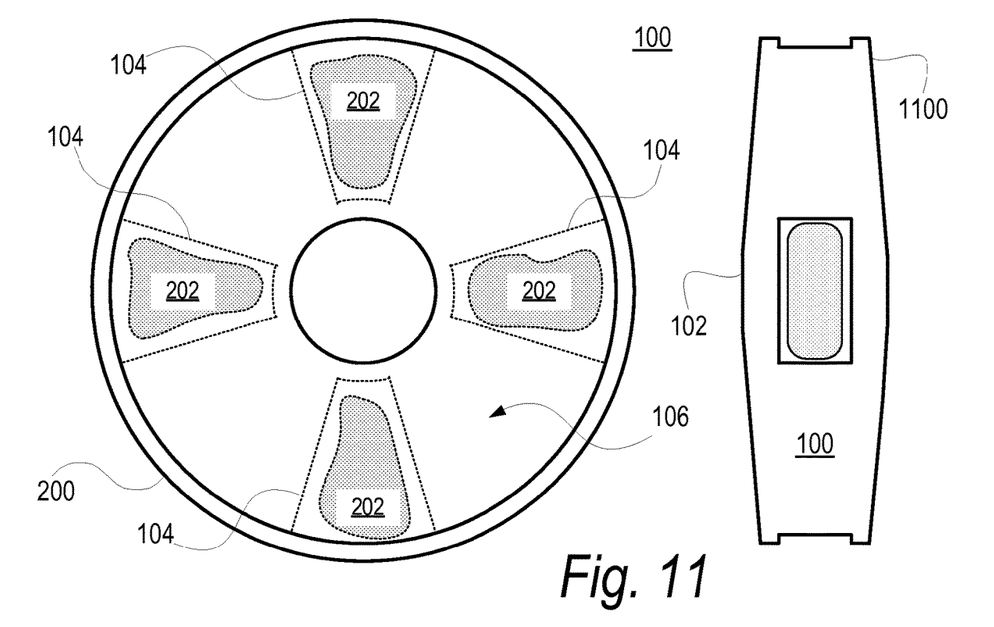
FIG. 11 is a top view and a side view of a torque-indicating crush washer formed in accordance with an implementation of the invention showing a relatively wider center portion.

FIG. 11 illustrates an implementation of a torque-indicating crush washer 100 wherein the center portion 102 of the washer 100 is wider than the edges 1100 of the washer 100. This is more clearly seen in the side view of FIG. 11. When a sufficient force and/or torque is applied, the use of a thicker center portion 102 may direct the indicator material 202 towards the edges 1100 of the torque-indicating crush washer 100 where it is discharged. The membrane 200 is not shown in the side view of FIG. 11 in order to expose the cavity 104.

Figure 12:
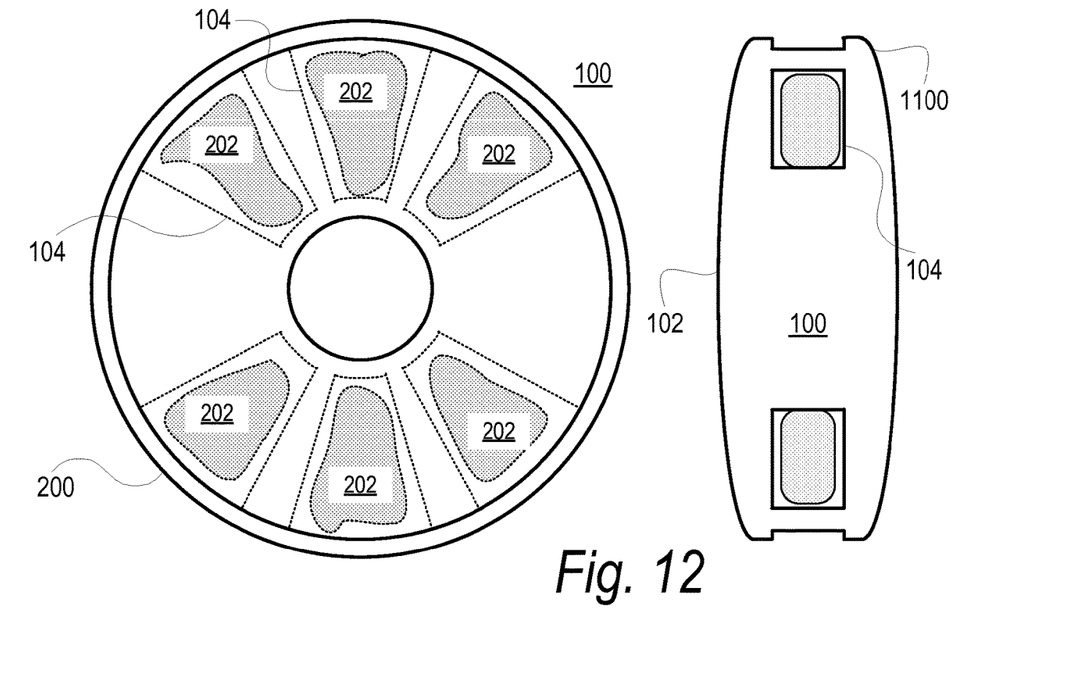
FIG. 12 is a top view and a side view of a torque-indicating crush washer formed in accordance with another implementation of the invention having curved top and bottom surfaces.

FIG. 12 illustrates another implementation of the crush-indicating washer 100 wherein the top and bottom surfaces are curved, as shown in the side view of FIG. 12. When a sufficient force and/or torque is applied, the use of a curved surface may direct the indicator material 202 towards the edges 1100 of the torque-indicating crush washer 100 where it is discharged. The membrane 200 is not shown in the side view of FIG. 12 in order to expose the cavities 104.

Figure 13:
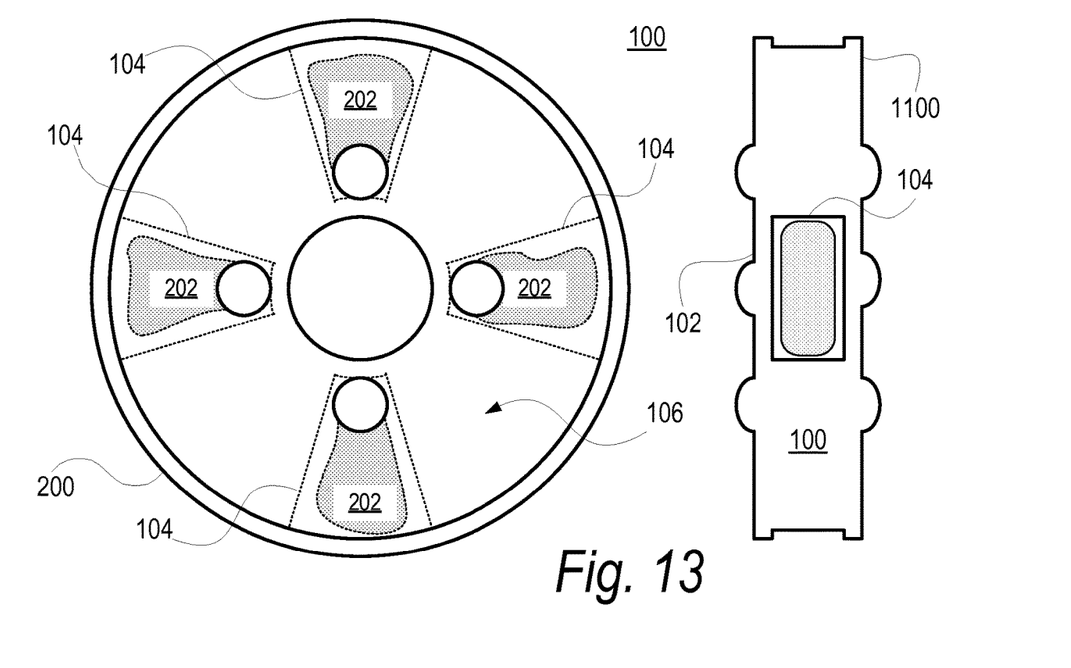
FIG. 13 is a top view and a side view of a torque-indicating crush washer formed in accordance with yet another implementation of the invention having crush bumps formed over the cavities.

FIG. 13 illustrates another implementation of the invention wherein crush bumps 1300 are formed atop one or more of the cavities 104. When a force and/or torque is applied to the torque-indicating crush washer 100, the crush bumps 1300 are generally the first structures to deform. When they deform, the crush bumps 1300 may force the indicator material 202 towards the edges 1100 of the torque-indicating crush washer 100 where it is discharged. The membrane 200 is not shown in the side view of FIG. 13 in order to expose the cavity 104.

In some implementations of the invention, the torque-indicating crush washer 100 may be formed using a molding process, an injection-molding process, a casting process, or a machining process. Most metal making processes that are suitable for making conventional washers may be used to make the torque-indicating crush washers 100 of the invention. In some implementations, the torque-indicating crush washer 100 may be formed in two halves that are then joined together.

As mentioned above, the amount of force or torque that is necessary to deform the torque-indicating crush washer 100 will vary based on its intended use. To this end, the torque-indicating crush washer 100 may be modified to work over a wide range of forces or torques through the appropriate selection of materials, separating wall dimensions, cavity dimensions, cavity number and placement, and membrane material and thickness.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. An apparatus comprising:
    a washer including a top surface, a bottom surface, and an outer circumference;
    a cavity included in the washer; and
    an indicator material within the cavity;
    a plurality of cavities in addition to the cavity, wherein the plurality of cavities are irregularly spaced around the aperture with regard to one another;
    wherein the indicator material is adhesive;
    wherein an aperture is centrally located within the washer and connects the top and bottom surfaces to each other;
    wherein the cavity is not coterminous with any of (a) the aperture; (b) the outer circumference; (c) the top surface; or (d) the bottom surface.

2. The apparatus of claim 1 comprising:
    an additional cavity that does not include the indicator material;
    wherein (a) the aperture does not directly connect to the additional cavity, and (b) the cavity does not directly connect to the additional cavity.

3. The apparatus of claim 1 wherein:
    the aperture includes an inner diameter (D1);
    the cavity includes a cavity depth (CD) that extends from an innermost portion of the cavity radially outwards to an outermost portion of the cavity;
    the cavity includes a height, taken orthogonal to the depth, which extends from a top portion of the cavity to a bottom portion of the cavity;
    the washer includes an outer diameter (D0); and
    the depth is not greater than (D0−D1)/2.

4. The apparatus of claim 1 wherein the indicator material is heat resistant.

5. The apparatus of claim 1 wherein the indicator material is substantially uncured.

6. The apparatus of claim 1, wherein the washer comprises at least one of a metal, a rubber, a polymer, or combinations thereof.

7. The apparatus of claim 6, wherein the washer comprises a polymer.

8. The apparatus of claim 6, wherein the indicator material comprises at least one of an epoxy, a sealant, a liquid rubber, a glue, a latex, an acrylic, a lacquer, or combinations thereof.

9. The apparatus of claim 8 wherein the cavity includes a port.

10. The apparatus of claim 9 wherein the port is sealed.

11. The apparatus of claim 10 wherein the port is sealed with metal.

12. The apparatus of claim 9 wherein:
a first wall of the washer is between the cavity and the outer circumference;
a second wall of the washer is between the cavity and the aperture;
the top surface directly contacts the cavity; and
the bottom surface directly contacts the cavity.

13. The apparatus of claim 1 wherein the cavity includes a sealed port.

14. The apparatus of claim 1 wherein:
an outer wall of the washer is between the cavity and the outer circumference;
an inner wall of the washer is between the cavity and the aperture;
the top surface directly contacts the cavity; and
the bottom surface directly contacts the cavity.

15. An apparatus comprising:
a washer including a top surface, a bottom surface, and an outer circumference;
a cavity included in the washer; and
a material included within the cavity;
wherein the material comprises at least one of an epoxy, a sealant, a liquid rubber, a glue, a latex, an acrylic, a lacquer, or combinations thereof;
wherein an aperture is centrally located within the washer and connects the top and bottom surfaces to each other;
wherein the cavity is not coterminous with any of (a) the aperture; (b) the outer circumference; (c) the top surface; and (d) the bottom surface;
wherein the cavity includes a sealed port.

16. The apparatus of claim 15 wherein:
an outer wall of the washer is between the cavity and the outer circumference;
an inner wall of the washer is between the cavity and the aperture;
the aperture includes a first long axis that does not intersect the washer; and
a second axis, parallel to the first axis, intersects the cavity; the top surface, and the bottom surface.

17. An apparatus comprising:
a washer including a top surface, a bottom surface, and an outer circumference;
a cavity included in the washer; and
an indicator material within the cavity;
wherein the indicator material is adhesive;
wherein an aperture is centrally located within the washer and connects the top and bottom surfaces to each other;
wherein the cavity is not coterminous with any of (a) the aperture; (b) the outer circumference; (c) the top surface; or (d) the bottom surface;
wherein the cavity includes a sealed port.

18. The apparatus of claim 17 wherein:
an outer wall of the washer is between the cavity and the outer circumference;
an inner wall of the washer is between the cavity and the aperture;
the aperture includes a first long axis that does not intersect the washer; and
a second axis, parallel to the first axis, intersects the cavity; the top surface, and the bottom surface.

19. The apparatus of claim 17 wherein:
the aperture includes an inner diameter (D1);
the cavity includes a cavity depth (CD) that extends from an innermost portion of the cavity radially outwards to an outermost portion of the cavity;
the cavity includes a height, taken orthogonal to the depth, which extends from a top portion of the cavity to bottom portion of the cavity;
the washer includes an outer diameter (D0); and
the depth is not greater than (D0–D1)/2.

20. The apparatus of claim 17 wherein:
a first wall of the washer is between the cavity and the outer circumference;
a second wall of the washer is between the cavity and the aperture;
the top surface directly contacts the cavity; and
the bottom surface directly contacts the cavity.

* * * * *